2,959,530
RADIOCHEMICAL HYDROGENATION PROCESS

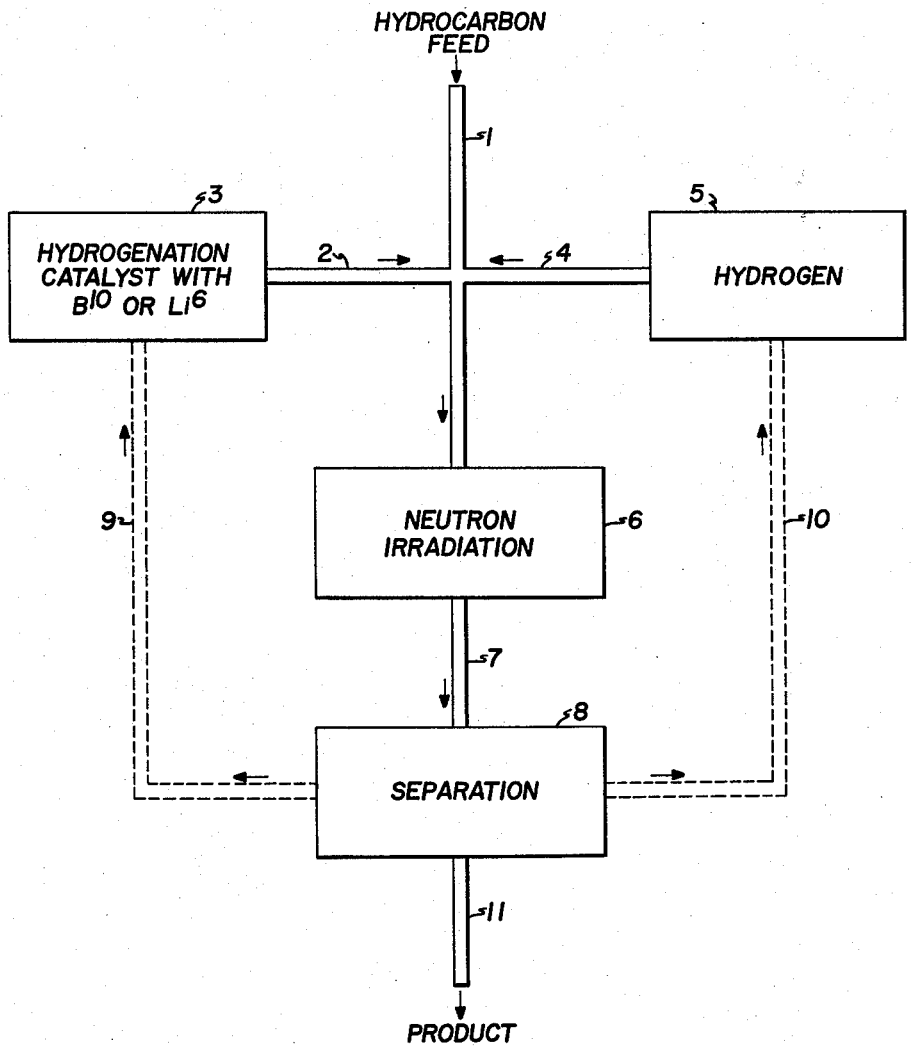
Robert B. Long
Peter J. Lucchesi
Barry L. Tarmy
Chester L. Read
Inventors
By L. A. Strimbeck  Attorney United States Patent Office 2,959,530
Patented Nov. 8, 1960

Robert B. Long, Wanamassa, Peter J. Lucchesi and Barry L. Tarmy, Cranford, and Chester L. Read, Westfield, N.J., assignors to Esso Research and Engineering Company, a corporation of Delaware Filed June 21, 1956, Ser. No. 592,986

9 Claims. (Cl. 204—154)

This invention relates to hydrocarbon radiochemistry and catalysts therefor. It is more particularly concerned with the conversion of petroleum hydrocarbons by neutron irradiation in the presence of a hydrogenation catalyst comprising a base, a hydrogenating component, and a material that upon neutron capture yields appreciable quantities of alpha particles of high kinetic energy.

In brief compass, this invention proposes an improvement of a process wherein hydrocarbons are converted in a reaction zone by neutron irradiation in the presence of a hydrogenation catalyst. The improvement of this invention comprises impregnating the catalyst with significant amounts of a neutron-capturing, alpha-emitting material, which acts as an accelerator and reaction modifier. An important feature of this invention is that the conversion of the hydrocarbons is carried out at moderate temperatures, i.e., temperatures below 600° F.

It is known to irradiate and convert materials, especially hydrocarbons, by exposure to high intensity ionizing radiation, such as beta and gamma rays and neutrons. The use of radiation to effect certain reactions affords a number of substantial advantages over conventional prior art practices.

It has now been found that when a hydrogenation catalyst, i.e., a catalyst comprising a porous base or carrier and a hydrogenation component, is impregnated with a material that has the ability to capture neutrons and emit highly ionizing alpha particles, here called an (n, $\alpha$) material for convenience, a superior, much more effective radiochemical catalyst is obtained. The (n, $\alpha$) material greatly accelerates the reaction rate and profoundly influences the catalyst and thus the conversion.

It has also suprisingly been found that in the irradiation of hydrocarbons in the presence of hydrogenation catalysts so impregnated, the catalysts exert an appreciable influence on the selectivity of the reaction, even when the reaction temperature is relatively moderate, i.e., the temperature is substantially below incipient thermal cracking or conversion temperatures, i.e., below 600° F. According to this invention, the impregnation of an (n, $\alpha$) material on a hydrogenation catalyst results in unexpected advantages when the catalyst is used for converting hydrocarbons in the presence of neutron irradiation.

This invention is applicable to a wide range of hydrocarbon feed stocks, including conventional petroleum oils, shale oils, tar sand oils, asphalts, synthetic oils, natural and artificial hydrocarbon gases, etc. It has the greatest use in the conversion of petroleum derived oils such as whole crudes, distillate and residual fractions therefrom, extracts or concentrates therefrom, or mixtures thereof. As later developed, very surprising and beneficial results are obtained when this new catalyst is used to convert a highly aromatic petroleum fraction, i.e., predominantly consisting of polynuclear aromatics boiling above 430° F. Cracking, with extensive hydrogenation of the cracked products, is obtained without resort to the use of extraneous hydrogen.

The catalyst used in this invention comprises a base material or carrier, which is preferably highly porous, and has, as active ingredients, a hydrogenation component and an accelerating component. Conventional hydrogenation catalyst bases known in the art may be used. These comprise, for example, dried hydrous oxides such as alumina, silica, zinc, titania and the like, or mixtures thereof. Other carriers such as activated carbon, kieselguhr, etc. can, of course, be used. The carrier material can be derived from natural sources such as from bauxite, or can be manufactured as by precipitating alumina from an alcoholate alumina or from an aluminum sulfate solution. It is prefered that the base material have a high surface area, i.e., an area above 50 m.²/gr. This surface area and other desired properties can be incorporated into the carrier by heat treatment, e.g., calcination; chemical treatment, e.g., acid treatment or chlorine treatment; and similar methods known to the art. The active components in some instances can be incorporated into or onto the base during manufacture of the base.

The hydrogenation component used is preferably a metal, oxide, sulfide or salt of a group VI or VIII element. Specific elements are nickel, cobalt, platinum, palladium, molybdenum, tungsten and mixtures thereof. Other known hydrogenation components can be used such as copper, silver and zinc. The base material can be impregnated with a catalytic component or mixture thereof by known methods such as by precipitation or mixing with a salt solution and drying.

The accelerating component used is a material that, upon capture of a neutron—usually one having energy below 100 e.v., produces alpha particles of high kinetic energy, i.e., greater than 0.1 m.e.v. Such alpha particles have tracks of high ion density. For convenience, these materials are here called (n, $\alpha$) materials. Of primary interest are boron and lithium, although other materials can be used such as Fe, oxygen 17 and zinc 67. The cross-section of the (n, $\alpha$) materials used is, preferably, above 100 barns. A sufficient amount of the (n, $\alpha$) material is used, preferably, to provide at least 10% of the energy absorbed by the hydrocarbon reactant or oil.

When the term "boron" is employed in this specification, it is intended to mean naturally-occurring boron. However, the novel results of the present invention are due to an interaction between neutrons and the isotope boron 10, which isotope is present in naturally-occurring boron to the extent of about 19 wt. percent. When the term "lithium" is used, it is intended to mean naturally-occurring lithium which contains $Li^6$ to the extent of about 8.0 wt. percent, which reacts $Li^6$ (n, $\alpha$) $H^3$. Concentrates of these isotopes can, of course, be used.

While, broadly, these (n, $\alpha$) materials have similar properties, they also have individual differences that can cause different results, particularly with specific reactions. For example, the higher neutron capture cross-section of boron 10, its lower alpha energy, and the difference in recoil particles, as compared to lithium 6, often causes it to give different results than lithium 6. Boron 10 and lithium 6, however, when intimately impregnated on the surface of a hydrogenation catalyst, have, in common, the ability to greatly accelerate the neutron irradiated conversion reaction and also to profoundly affect the hydrogenating component of the catalyst.

The (n, $\alpha$) materials, when employed in this invention, can be present in the form of elements, and/or as compounds. The catalyst is usually impregnated with an (n, $\alpha$) compound, which then can be reduced if desired. In some cases, the (n, $\alpha$) material can not only be distended on a base material, but also can be compounded or mixed with the base.

Specific compounds of boron which are useful in this invention for impregnation include: inorganic borates and boric acid; boron halides such as $BF_3$ or $BCl_3$; boranes, $B_2O_3$, and borax.

Specific compounds of lithium which are useful include: $LiNO_3$, $LiHCO_3$, lithium aluminum hydride, $LiCH_3$, $LiC_2H_5$, and lithium phenol.

In some instances, it is desirable to use an alkali metal borohydride on the catalyst. Specific compounds that can be used are: $KBH_4$, $NaBH_4$ and $NiBH_4$. The use of these compounds is particularly suitable for converting refractory material of low H/C ratio to lower boiling saturates with minimum formation of unsaturated polymer.

The catalyst used preferably has a particle size under about 1000 microns, but can be much larger in size if desired, e.g., one inch or more. The surface area of the catalyst is in the range of 50 to 600 m.²/gr., and the pore size is in the range of 20 to 150 A. The catalytic and carrier materials used are normally those which, upon neutron bombardment, produce radioisotopes having short half lives, i.e., less than 10 weeks and preferably less than one week, or have small neutron capture cross-sections so that very little of the material becomes radioactive.

The catalyst can be used as a suspension in the hydrocarbon reactant, or as fixed, fluid, or gravitating beds, all of which methods are known in the art. The catalyst, if contaminated, as by carbon deposition, can be regenerated by known methods such as burning, acid treating, chemical reworking and the like. The solids can be regenerated in place or external of the reactor, and either continuously or periodically, as the need arises. The (n, α) material concentration can be maintained by addition of fresh catalyst, addition of suitable compounds to the feed, or by reimpregnating recycled catalyst, either continuously or periodically.

This invention is based in part upon the important finding that hydrogenation catalysts surprisingly display an appreciable effect on selectivity at moderate temperatures, i.e., at temperatures below 600° F. This means that it is now possible to operate at lower temperatures, heretofore unattractive because of the slowness of the reaction rate, and this permits the obtainance of reactions and selectivities not previously possible. Of prime interest is that undesirable secondary reactions can be avoided.

This invention is applicable to conversion reactions wherein the reactants are wholly or partly in the gas, liquid or solid phase. It is most advantageously used with liquid phase reactions and the pressure used is, therefore, preferably sufficient to maintain substantially liquid phase conditions.

It has been found that even during the cracking of what have customarily been thought of as hydrogen-deficient materials, the lighter cracked products obtained are relatively highly saturated. The present invention can, therefore, secure operation equivalent to hydrogenation operations without the use of extraneous hydrogen or a hydrogen atmosphere. Hydrogen can, of course, be added to the reactants to secure an even greater degree of hydrogenation. For this reason too, while the process is operable at substantially atmospheric pressure, higher pressures, e.g., up to 1000 atmospheres or greater, with or without the use of extraneous hydrogen, will favor saturation of the product fractions.

The process of this invention can most conveniently be carried out, particularly on a commercial scale, by employing a nuclear reactor and can be carried out either on a batch or a continuous basis. The present process is preferably carried out with some type of agitation or continuous flow, so that there is sufficient contact between the oil, the ionizing radiation, and the sub-divided catalytic solids. To carry out a continuous process, the material to be irradiated can be simply pumped through the pile itself, or through pipes disposed in the pile. In some instances, the hydrocarbon reactant can also serve as a moderator.

The drawing attached to and forming a part of this specification schematically illustrates this invention.

In the drawing, a hydrocarbon material, e.g., a distillate virgin naphtha, is introduced into the process by line 1. A hydroforming catalyst, e.g., alumina impregnated with platinum and boria supplied by line 2 from source 3, is mixed with the feed material. As shown here, hydrogen supplied by line 4 from reservoir 5 is admixed with the hydrocarbon feed, although its use in many cases is not necessary. The resulting mixture is then passed through irradiation source 6.

The amount of (n, α) material present is dependent to some extent on the neutron flux and more particularly, the concentration of the material in the reaction mixture is inversely related to the neutron flux. This relationship can be expressed as follows:

$$C = \frac{K}{F_n}$$

where C represents the concentration of (n, α) isotope expressed in weight percent in the reaction mixture, $F_n$ represents the neutron flux expressed as neutrons/cm.²/sec., and K represents a factor expressing the relationship between C and $F_n$. It is desired that K have a value in the range of $10^8$ to $10^{14}$, preferably $10^{11}$ to $10^{13}$ for boron[10], and values in the range of $5 \times 10^8$ to $5 \times 10^{14}$, preferably $5 \times 10^{11}$ to $5 \times 10^{13}$, for lithium[6].

Preferably the concentration of boron in the reaction mixture is about 0.001 to 1.0% by weight based on the total reaction mixture, and the concentration is 0.001 to 5.0 wt. percent for lithium. Expressed as wt. percent on catalyst, the amount of (n, α) material used is in the range of 0.05 to 10 wt. percent, for most oil/catalyst ratios used. Lesser or greater concentrations can be employed if desired. These concentrations refer to the concentration of the element per se, whether it be in metallic form or in the form of a compound thereof.

The radiation from the atomic pile consists primarily of neutrons and gamma rays. The neutron flux used is preferably above about $10^{11}$ neutrons/cm.²/sec., and the gamma ray flux is above about $10^6$ roentgens/hr. The present process is most effectively carried out employing slow neutrons, i.e., neutrons having an energy less than about 100 electron volts. Preferably the majority of the neutrons are slow neutrons. Moderators such as carbon, light or heavy water, or hydrocarbons, can be employed, if desired, to obtain the desired proportion of slow neutrons.

Although a suspensoid system is shown in the drawing, i.e., the solids are carried by the hydrocarbon reactant through the reaction zone, the catalyst can exist as fixed, fluid or gravitating beds within the radiation zone 6. With fluid beds the pipes carrying the reactant through the atomic pile are preferably vertical with upflow of the fluid reactant.

The irradiated material is transferred by line 7 to separation zone 8. The separation zone comprises means for recovering the catalyst such as by distillation, filtration, and absorption. The recovered catalyst can be directly recycled, if desired, by line 9 or can be first treated as by burning, steaming, and the like to remove contaminates and/or improve its properties.

The hydrocarbon products and unused hydrogen, if any, are also separated in zone 8. Thus distillation, extraction, or absorption, as with molecular sieves, can be used. If desired, the hydrogen and/or some of the hydrocarbon product can be recycled by line 10.

Separation zone 6 can also include means for removing and/or neutralizing radioactive waste products. Such means can include storage tanks to permit decay of radioactivity, ion exchange apparatus, distillation columns, and solvent extraction units. The finished product is removed from the process by line 11.

This invention will be more fully understood by reference to the following examples.

Three oils were treated according to the method of this invention.

*Oil A.*—A hydrogenated kerosene, having an API gravity of 45.7°, a refractive index of 1.4407, a sulfur content of 0.09 wt. percent and a boiling range of 250°/520° F.

*Oil B.*—A phenol extract of a catalytic cycle stock (560–700° F.) obtained by cracking a heavy West Texas gas oil. This extract contained 95% polynuclear aromatic compounds and had 11.4° API gravity and a sulfur content of 1.6 wt. percent. 90% of the extract boiled in the range of 600°–700° F. at atmospheric pressure.

*Oil C.*—*Pure cetane.*—A boron impregnated platinum on alumina catalyst was used to convert these materials. The platinum on alumina catalyst was a commercially available alcoholate alumina catalyst containing 0.6 wt. percent platinum and 0.6 wt. percent chlorine, known as Davison Type 1000. The catalyst was in the form of $3/16$-inch x $1/8$-inch cylinders having a surface area of 300 m.$^2$/gr. and a pore size of 50 to 80 A. This platinum alumina catalyst was impregnated with a water solution of boric acid, dried at 600° F. and calcined for four hours at 800° F.

The air cooled, natural uranium, graphite moderated research reactor of the Brookhaven National Laboratories was used for these tests. This pile was operating at a total power of about 24 megawatts at the time which gave the following flux distribution at the point where the oils were irradiated:

Slow neutron flux (.03 e.v.) = $2.5 \times 10^{12}$ neutrons/cm.$^2$/sec.

Fast neutron flux (>1 m.e.v.) = $0.5 \times 10^{12}$ neutrons/cm.$^2$/sec.

Gamma intensity = $1.7 \times 10^6$ roentgens/hr.

The core of the reactor was approximately a 20 ft. x 20 ft. x 20 ft. lattice of graphite with horizontal one-inch diameter aluminum-clad uranium rods spaced evenly throughout the reactor extending from the north to south faces of the core. This core was completely surrounded by 5 ft. of concrete shielding. The sample holes used for irradiation were horizontal 4-inch x 4-inch square holes extending through the 5 ft. concrete shield and into the carbon core for a distance of 10 ft. from the core face. Normal operating temperatures in the experimental hole were from 250° to 400° F.

Radiations were carried out as follows:

Three one-quart samples were irradiated at one time by placing them in three vented 3-inch diameter aluminum containers which were mounted on a horizontal aluminum sled. The vents of aluminum tubing extended from the vapor space in the containers out of the core and through the shielding to a sample receiver system where gases and condensable liquids were metered and collected. The samples were prepared by adding the solids to the container to fill it, evacuating the void space in the container, and sucking the oil into the container with the vacuum. The samples were then purged with purified nitrogen and inserted in the pile during scheduled shutdowns. After irradiation for ten days, they were withdrawn from the pile during the next shutdown.

The following Table I presents the results of these experiments. Table II gives a more complete analysis of the lighter materials obtained from the conversion of Oil B using a catalyst containing 1% boron. This is the material that is distilled overhead during the initial part of the run. Specifically, within three days, 60% of the feed was cracked to lighter boiling product which was distilled out of the vent line and recovered.

*Table I*

| Feed | 1 | 2 | 3 | 4 |
|---|---|---|---|---|
|  | Oil A | Oil B |  | Oil C |
| Amount of Boron, percent | 1.0 | 0.186 | 1.0 | 0.14 |
| Days Irradiated |  | 10 | 10 | [1] 14 | [2] OH |
| Conversion to C$_3$—, wt. percent | 32.0 | 4.4 | 12.1 |  |
| Products: |  |  |  |  |
| Boiling Range | 0/430 | 0/560 | 0/480 | 0/402 |
| Percent on Feed | 26.5 | 5.4 | 0 | 5.8 |
| Sulfur, wt. Percent | 0.0001 |  |  | 0.016 |
| Vol. Percent Aromatics | 0.9 | 24.8 |  | 0.9 |
| Vol. Olefins | 2.6 | 25.2 |  | 0.9 |
| Vol. Saturates | 96.5 | 50.0 |  | 98.2 |
| Bromine No | 0.96 | 14.2 |  | 1.46 |
| Gravity, °API | 63.5 | 36.2 |  | 64.8 |
| Boiling Range | 430/600 |  | 480/600 |  |
| Percent on Feed | 7.7 |  | 1.1 |  |
| Sulfur, wt. Percent |  |  |  |  |
| Vol. Percent Aromatics | 0.9 |  | 69.1 |  |
| Vol. Olefins | 4.4 |  | 22.1 |  |
| Vol. Saturates | 94.7 |  | 8.8 |  |
| Bromine No | 2.2 |  | 13.0 |  |
| Boiling Range | 600/700 | 560/700 | 600/700 |  |
| Percent on Feed | 5.4 | 29.9 | 3.4 |  |
| Sulfur, wt. Percent |  | 1.59 | 1.39 |  |
| Gravity, °API |  | 14.9 |  |  |
| Bromine No | 7.26 | 11.4 |  |  |
| Boiling Range |  | 700/900 | 700/900 |  |
| Percent on Feed |  | 13.2 | 1.8 |  |
| Boiling Range |  | 900/980 | 900/955 |  |
| Percent on Feed |  | 11.1 | 1.9 |  |
| Boiling Range | 700+ | 980+ | 955+ | 402+ |
| Percent on Feed | 25.3 | 39.7 | 16.9 | 1.2 |

[1] This analysis is for material left in container at end of run.
[2] Material distilled and recovered overhead.

*Table II*

| Cut, Percent | 0–10 | 10–20 | 20–30 | 30–40 | 40–50 | 50–60 | 60–70 |
|---|---|---|---|---|---|---|---|
| Temp., °F | 297 | 342 | 376 | 408 | 440 | 484 | 534 |
| FIA,[1] Vol. Percent: |  |  |  |  |  |  |  |
| Aromatics | 8.7 | 11.8 | 11.2 | 11.1 | 11.9 | 13.6 | 15.7 |
| Olefins | 18.8 | 11.4 | 10.3 | 11.1 | 11.9 | 11.7 | 15.7 |
| Saturates | 72.5 | 76.8 | 78.5 | 77.8 | 76.2 | 74.7 | 68.6 |
| Aniline Point | 120 | 130 | 135 | 139 | 144 | 148 | 149 |
| API Gravity |  |  |  |  | 43.3 | 40.9 | 37.8 |
| Diesel Index [2] |  |  |  |  | 62.4 | 60.5 | 56.3 |
| Mass Spec.: |  |  |  |  |  |  |  |
| Percent Paraffins | 40 | 40 |  |  |  |  |  |
| Percent Naphthenes | 40 | 40 |  |  |  |  |  |

[1] Fluorescence intensity analysis.
[2] Diesel Index = $\dfrac{°\text{API} \times \text{Aniline Point}}{100}$ It was found during these experiments that the rate of reaction was increased about 25-fold as indicated by initial rate of gas evolution when borated catalysts were used, as compared to the non-use of boron. This acceleration is important. It results in a more economical process from the time standpoint, and also permits more reaction to be obtained per radiation energy input.

The results with the cycle stock extract which contains more than 95% polynuclear aromatics are particularly interesting. This material was cracked to yield about 30% naphtha that was 80% saturated. This is a highly unexpected result, and it seems to be particularly brought about by the presence of the (n, α) material on the catalyst, for when the (n, α) material is simply dissolved in the reactants, equivalent hydrogenation is not obtained.

The borated hydrogenation catalyst also gave a highly saturated naphtha when converting cetane, as compared to simply using a borated carrier. 98% saturated naphtha was obtained with the borated hydrogenation catalyst, whereas only 33% saturation was obtained under equivalent conditions with 2% boron on alumina alone.

The 480–600 material obtained by converting the cycle stock has a relatively high aniline point, A.P.I. gravity, and high diesel index—indicating that it is suitable as a diesel fuel.

These data show a high degree of utilization of available hydrogen, even at atmospheric pressure, and show a surprisingly good conversion of the aromatic constituents. By conducting reactions of this type under pressure and in a hydrogen atmosphere, more completely saturated products are obtained.

When hydrogen atmosphere is used, the formation of reactive hydrogen by this particular catalyst will give less hydrogen consumption and increase efficiency.

The catalyst of this invention can be used to decompose porphyrins and metal containing molecules in residua. The removal of metals is desirable in upgrading residua to obtain more valuable products. Halogen gas or gases which form volatile vanadium and heavy metal salts can be used when treating residua in this manner. After treatment of a residuum, the material can be acid washed or filtered to remove metals liberated from the organic compounds.

While this technique is particularly valuable for the conversion of refractory feeds such as residua and cycle stocks, and carbonaceous materials such as shale oils, tar sand oils, coal and coal oils, it can also be used for other known processes where hydrogenation is involved such as in hydroforming of naphthas, and hydrocracking of gas oils.

Having described this invention, what is sought to be protected by Letters Patent is succinctly set forth in the following claims.

What is claimed is:

1. In a process for converting normally liquid hydrocarbons in a reaction zone by neutron irradiation in the presence of a hydrogenation catalyst, the improvement which comprises impregnating said catalyst with an (n, α) material.

2. The process of claim 1 wherein the conversion temperature is maintained below 600° F.

3. The process of claim 1 wherein said (n, α) material comprises an isotope selected from the group consisting of lithium$^6$ and boron$^{10}$.

4. The process of claim 1 wherein the conversion pressure is sufficient to maintain substantially liquid phase conditions.

5. The process of claim 1 wherein said hydrocarbon comprises a petroleum fraction consisting predominantly of polynuclear aromatics boiling above 430° F., and said catalyst comprises a borated platinum on alumina catalyst.

6. An improved petroleum oil conversion process which comprises irradiating an oil with neutrons in intimate contact with a particulate hydrogenation catalyst comprising a carrier impregnated with a hydrogenation component and with an accelerating component selected from the group consisting of lithium$^6$ and boron$^{10}$.

7. An improved hydrocarbon radiochemical hydrogenation catalyst which comprises a porous carrier impregnated with a hydrogenating component and with an (n, α) material.

8. The catalyst of claim 7 wherein said hydrogenation component is selected from the group consisting of nickel, cobalt, platinum, palladium, molybdenum, tungsten and mixtures thereof.

9. The catalyst of claim 7 wherein said (n, α) material is selected from the group consisting of lithium$^6$ and boron$^{10}$.

References Cited in the file of this patent

UNITED STATES PATENTS

| | | |
|---|---|---|
| 1,338,709 | Sulzberger | May 4, 1920 |
| 2,350,330 | Remy | June 6, 1944 |
| 2,377,744 | Bailey | June 5, 1945 |
| 2,424,152 | Connolly | July 15, 1947 |
| 2,743,223 | McClinton et al. | Apr. 24, 1956 |

FOREIGN PATENTS

| | | |
|---|---|---|
| 665,263 | Great Britain | Jan. 23, 1952 |

OTHER REFERENCES

Davidson et al.: A.E.C. Document MDDC–1949, November 12, 1947.

Davidson: "Jour. of Applied Physics," vol. 19, pages 427–433, May 1948.

Mincher: "A.E.C. Document KAPL–731," pages 3–7, April 2, 1952, declassified February 15, 1955.